(12) United States Patent
Read et al.

(10) Patent No.: US 7,753,654 B2
(45) Date of Patent: Jul. 13, 2010

(54) AEROFOILS FOR GAS TURBINE ENGINES

(75) Inventors: Simon Read, Derby (GB); Peter R Beckford, Derby (GB)

(73) Assignee: Rolls-Royce plc, London (GB)

( * ) Notice: Subject to any disclaimer, the term of this patent is extended or adjusted under 35 U.S.C. 154(b) by 642 days.

(21) Appl. No.: 11/648,600

(22) Filed: Jan. 3, 2007

(65) Prior Publication Data

US 2010/0143097 A1 Jun. 10, 2010

(30) Foreign Application Priority Data

Jan. 21, 2006 (GB) .................. 0601220.7

(51) Int. Cl.
*B64C 11/24* (2006.01)
(52) U.S. Cl. .............. 416/229 R; 416/241 R; 416/500
(58) Field of Classification Search ........ 416/232, 416/241 R, 229 R, 500, 233, 230; 29/889.72
See application file for complete search history.

(56) References Cited

U.S. PATENT DOCUMENTS

2003/0185685 A1* 10/2003 Simon .................... 416/229 R
2004/0018091 A1* 1/2004 Rongong et al. ........ 416/229 A
2007/0243069 A1* 10/2007 Read ...................... 416/229 R

FOREIGN PATENT DOCUMENTS

| GB | 1 130 285 SP | 10/1968 |
|---|---|---|
| GB | 1 235 545 SP | 6/1971 |
| GB | 2 228 699 A | 9/1990 |
| GB | 2 264 755 A | 9/1993 |
| GB | 2 403 987 A | 1/2005 |
| GB | 2 418 459 A | 3/2006 |

* cited by examiner

*Primary Examiner*—Edward Look
*Assistant Examiner*—Dwayne J White
(74) *Attorney, Agent, or Firm*—Jeffrey S. Melcher; Manelli Denison & Selter PLLC

(57) ABSTRACT

An aerofoil 26 for a gas turbine engine (10, FIG. 1) comprises a cavity 38, a cellular material 42 located in the cavity 38 for stiffening the aerofoil 26, and a vibration damping medium 44 located in the cavity 38 for damping the aerofoil. The cellular material 42 is preferably a metal foam bonded to the inner surface 34*a*, 36*a* of the hollow aerofoil 26, and the vibration damping medium 44 is preferably a viscoelastic material. Various methods for fabricating the aerofoil 26 are also described.

32 Claims, 4 Drawing Sheets

AEROFOILS FOR GAS TURBINE ENGINES

FIELD OF THE INVENTION

The present invention relates to aerofoils for gas turbine engines, and more particularly to blades for gas turbine engines. The present invention also relates to methods for fabricating aerofoils for gas turbine engines.

BACKGROUND OF THE INVENTION

One of the many ways of reducing the weight of gas turbine engines is to provide engines with hollow blades, for example hollow fan blades, rather than conventional solid material blades. This can provide a significant reduction in the individual and collective weight of the fan blades, and hence the propulsive fan. A reduction in the weight of gas turbine engines is particularly advantageous when they are intended for use in aircraft installations. Hollow blades are, however, disadvantageous when compared to solid material blades.

BRIEF SUMMARY OF THE INVENTION

According to a first aspect of the present invention, there is provided an aerofoil for a gas turbine engine, the aerofoil defining a cavity and comprising a cellular material located in the cavity for stiffening the aerofoil, and a vibration damping medium located in the cavity for damping the aerofoil.

The cellular material may be distributed generally uniformly throughout the cavity. The cellular material may comprise a plurality of open cells which may together form an open cell structure.

The aerofoil may comprise an inner surface which may define the cavity, and the cellular material may be bonded to the inner surface. The aerofoil may comprise first and second opposed walls which may define the cavity therebetween. The first and second walls may be joined around their respective edges to define the cavity, and the cellular material may be bonded to the first and second walls. The first wall may be a concave wall. The second wall may be a convex wall.

The cellular material may comprise a metal, and may comprise a metal foam. The metal foam may be a nickel foam, a nickel alloy foam, a titanium foam, a titanium alloy foam, an aluminium foam, an aluminium alloy foam, a magnesium alloy foam or a steel foam.

The vibration damping medium may be distributed generally uniformly throughout the cavity. The vibration damping medium may be dispersed generally uniformly throughout the cellular material.

The vibration damping medium may comprise a viscoelastic material. The viscoelastic material may have a glass transition temperature in the range 20° C. to 100° C., and may have a glass transition temperature in the range 50° C. to 60° C.

The aerofoil may form part of a blade of a gas turbine engine.

According to a second aspect of the present invention, there is provided a gas turbine engine incorporating an aerofoil according to the first aspect of the present invention.

According to a third aspect of the present invention, there is provided a blade for a gas turbine engine, the blade including an aerofoil according to the first aspect of the present invention.

According to a fourth aspect of the present invention, there is provided a blade for a gas turbine engine, the blade comprising a root and an aerofoil, the aerofoil having a leading edge, a trailing edge, a concave wall extending from the leading edge to the trailing edge and a convex wall extending from the leading edge to the trailing edge, the concave wall and the convex wall forming a continuous integral wall, the aerofoil comprising a cavity defined by the continuous integral wall, a cellular material located in the cavity for stiffening the aerofoil, and a vibration damping medium located in the cavity for damping the aerofoil.

The aerofoil may be according to the first aspect of the present invention.

According to a fifth aspect of the present invention, there is provided a gas turbine engine incorporating a blade according to the third or fourth aspects of the present invention.

According to a sixth aspect of the present invention, there is provided a method for fabricating an aerofoil for a gas turbine engine, the method comprising forming an aerofoil having a cavity, providing a cellular material inside the cavity, and introducing a vibration damping medium into the cavity.

The method may comprise locating aerofoil walls around the cellular material and thereafter may comprise bonding the aerofoil walls together to define the cavity in which the provided cellular material is located.

The method may comprise forming the cellular material with an aerofoil profile prior to locating the aerofoil walls around the provided cellular material.

The method may comprise bonding the cellular material to the aerofoil walls prior to introducing the vibration damping medium into the cavity. The method may comprise bonding the cellular material to the aerofoil walls simultaneously with the step of bonding the aerofoil walls together. The method may alternatively comprise bonding the cellular material to the aerofoil walls after the step of bonding the aerofoil walls together.

The method may comprise introducing an adhesive material into the cavity prior to introducing the vibration damping medium into the cavity, and may comprise curing the adhesive material to effect said bonding of the cellular material to the aerofoil walls.

The step of providing the cellular material inside the cavity may comprise foaming a powder material inside the cavity to form a cellular structure.

The method may comprise forming the aerofoil around the powder material to locate the powder material inside the cavity. The method may alternatively comprise introducing the powder material into the cavity after the step of forming the aerofoil.

The step of foaming the powder material may comprise activating a foaming agent mixed with the powder material.

The step of providing the cellular material inside the cavity may comprise providing first and second powder materials inside the cavity, sintering the first powder material, and thereafter removing the second powder material from the cavity so that the sintered first powder material defines a cellular structure inside the cavity.

The first powder material may comprise a metal and the second powder material may comprise a ceramic.

The step of removing the second powder material may comprise introducing a chemical agent into the cavity. Alternatively or additionally, the step of removing the second powder material may comprise heating the aerofoil to melt the second powder material.

BRIEF DESCRIPTION OF THE DRAWINGS

An embodiment of the present invention will now be described by way of example only, and with reference to the accompanying drawings, in which:—

DETAILED DESCRIPTION OF THE INVENTION

Figure 1:
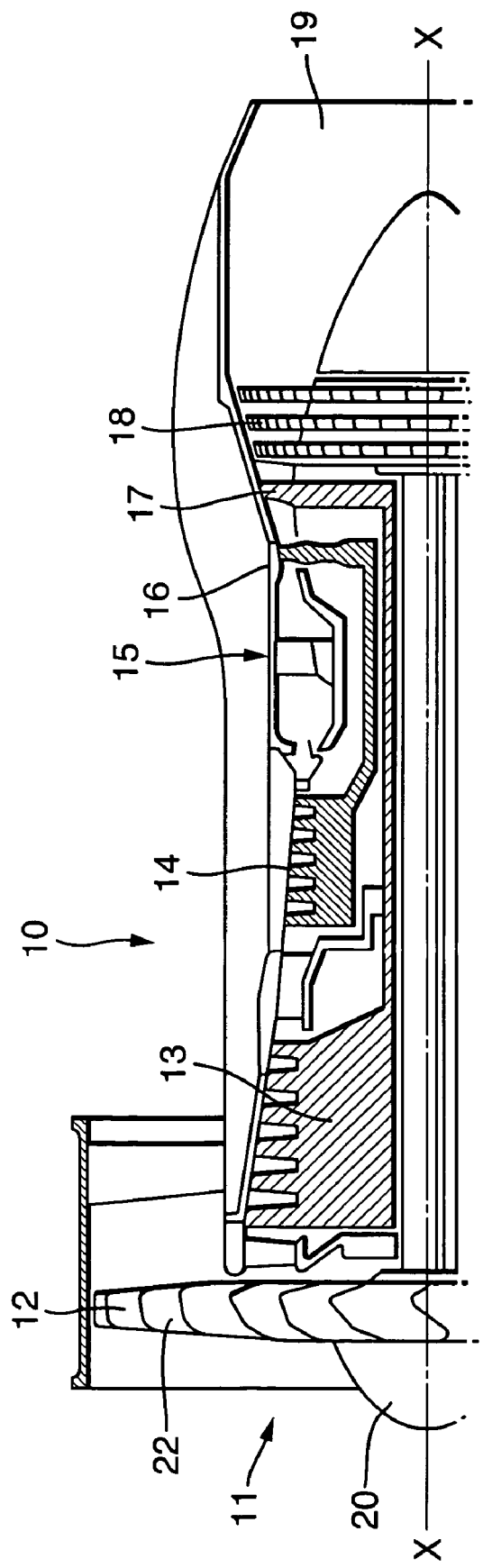
FIG. 1 is a diagrammatic cross-sectional view of a gas turbine engine incorporating an aerofoil according to the present invention.

Referring to FIG. 1, a gas turbine engine is generally indicated at 10 and comprises, in axial flow series, an air intake 11, a propulsive fan 12, an intermediate pressure compressor 13, a high pressure compressor 14, combustion equipment 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produces two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13, and the fan 12 by suitable interconnecting shafts.

Figure 2:
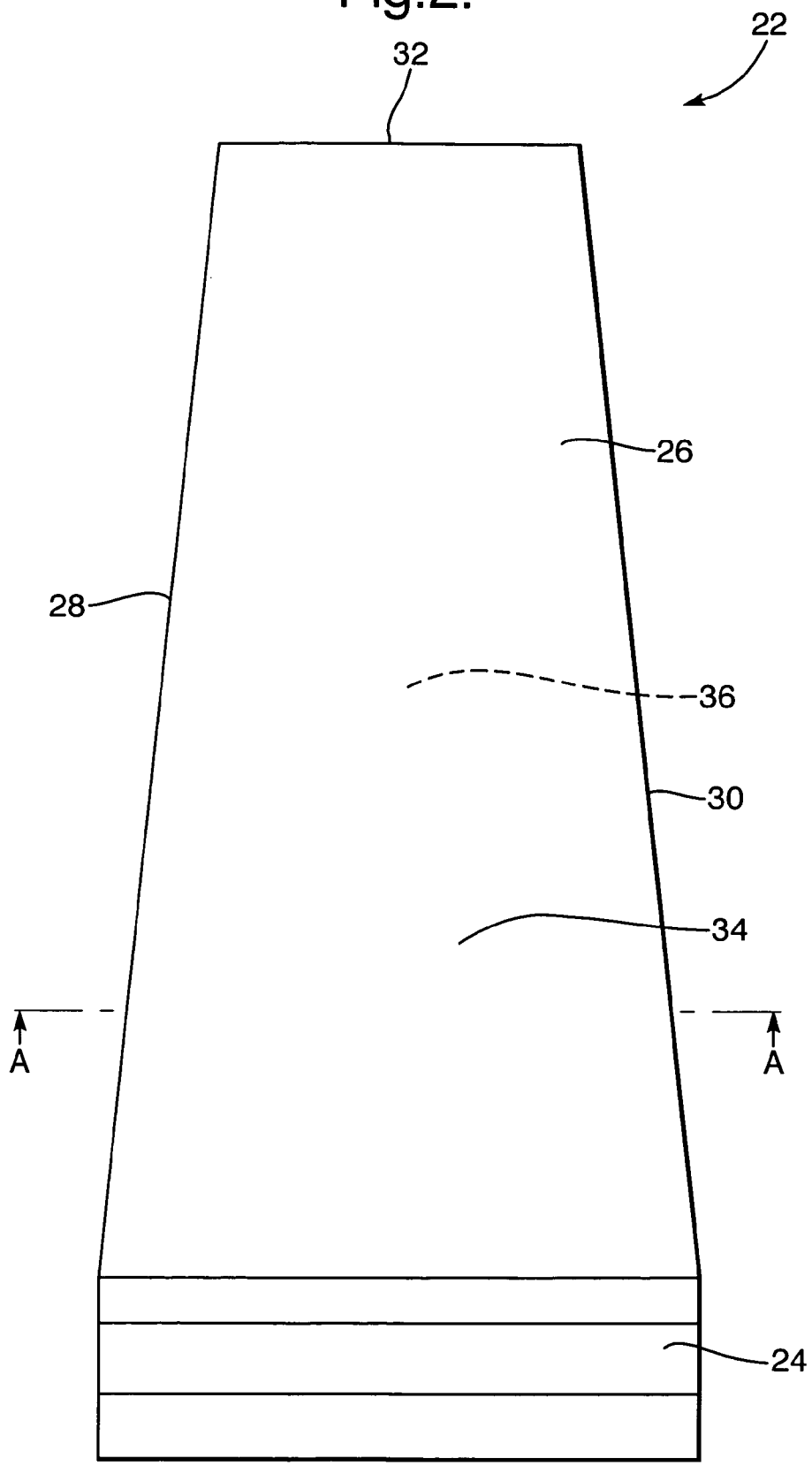
FIG. 2 is an enlarged view of a blade of the engine of FIG. 1 including an aerofoil according to the present invention.
Figure 3:
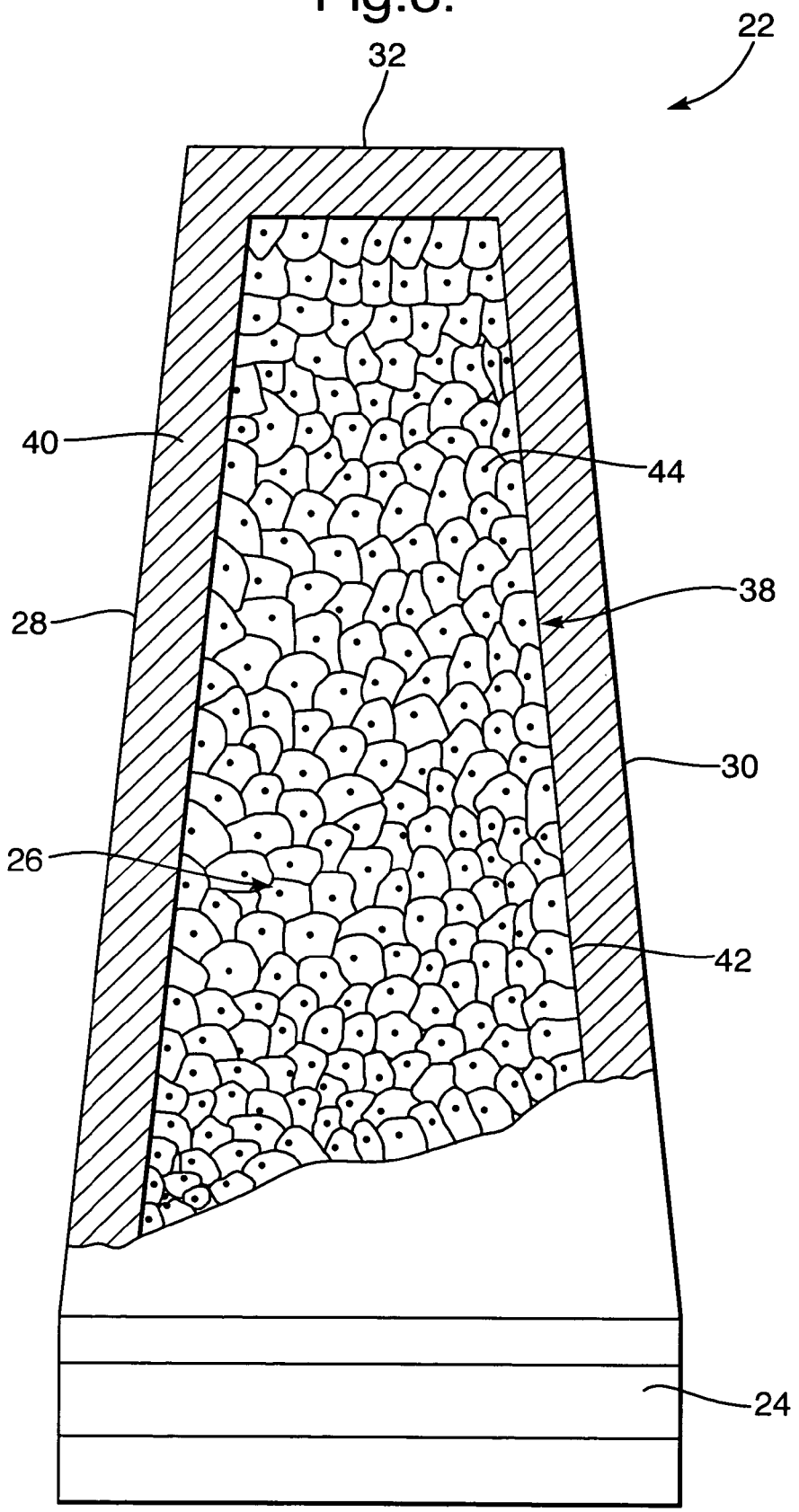
FIG. 3 is a cut away view through the blade of FIG. 2.

The propulsive fan 12 comprises a fan rotor 20 carrying a plurality of equi-angularly spaced radially outwardly extending fan blades 22. In more detail, and referring to FIGS. 2 to 4, each blade 22 comprises a blade root 24 and an aerofoil 26 extending from the root 24. The root 24 comprises a dovetail root, a firtree root, or other suitably shaped root for fitting in a correspondingly shaped slot in the fan rotor.

The aerofoil 26 has a leading edge 28, a trailing edge 30 and a tip 32. The aerofoil 26 comprises a first wall 34, in the form of a concave wall, which extends from the leading edge 28 to the trailing edge 30, and an opposed second wall 36, in the form of a convex wall, which extends from the leading edge 28 to the trailing edge 30. The first and second opposed walls 34, 36 comprise a metal, for example a titanium alloy. The aerofoil 26 has a hollow interior in the form of a cavity 38, and the first and second walls 34, 36 are joined around their respective edges 40 to form a continuous integral wall defining the cavity 38.

Figure 4:
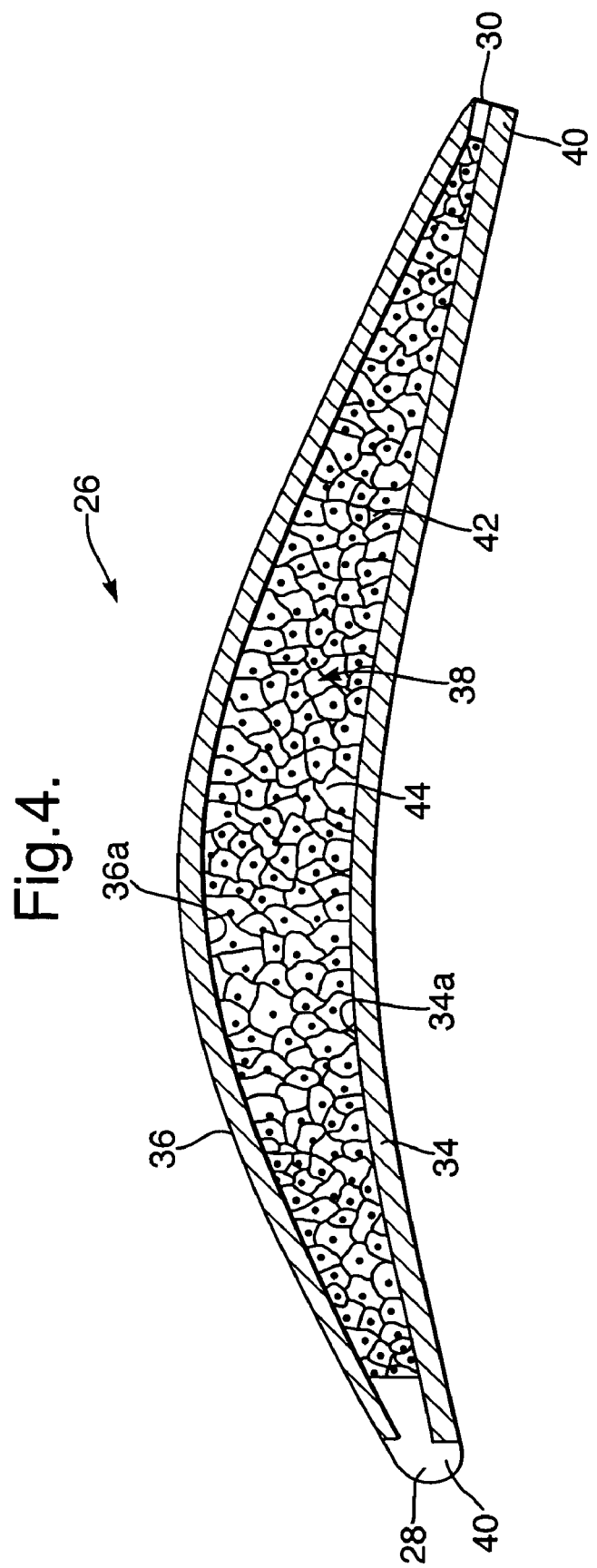
FIG. 4 is a sectional view along the line A-A of FIG. 2.

Referring in particular to FIG. 4, the cavity 38 contains a cellular material 42 which stiffens the aerofoil 26. In one embodiment of the invention, the cellular material 42 is distributed generally uniformly throughout the cavity 38 to provide uniform stiffness to the aerofoil 26, and is bonded to the inner surfaces 34a, 36a of the first and second walls 34, 36, for example by diffusion bonding, brazing, liquid phase diffusion bonding or by using a suitable structural adhesive.

In alternative embodiments, the density of the cellular material 42 may be varied throughout the cavity 38. For example, the cellular material 42 may be distributed throughout the cavity 38 so that it has a greater density in regions of the aerofoil 26 where impacts are more likely, thus providing the aerofoil 26 with greater stiffness in these regions, and so that it has a lower density in regions where impacts are less likely, thus minimising the overall weight of the aerofoil 26.

The cellular material 42 comprises a plurality of open cells forming an open cell structure, and in one embodiment of the invention, the cellular material comprises a metal foam or metal sponge. In embodiments of the invention, the metal foam comprises nickel foam, nickel alloy foam, titanium foam, titanium alloy foam, aluminium foam, aluminium alloy foam, magnesium alloy foam or steel foam.

In order to ensure that the blade 22 is sufficiently damped in use, the aerofoil 26 further comprises a vibration damping medium 44 located in the cavity 38 and distributed generally uniformly throughout the cellular material 42.

In particular, the vibration damping medium 44 is arranged within the cells of the cellular material 42 e.g. within the cells of the open cell structure, within the cavity 38 in the aerofoil 26.

The vibration damping medium 44 comprises a viscoelastic material exhibiting viscoelasticity. Viscoelasticity is a property of a solid or liquid which, when deformed, exhibits both viscous and elastic behaviour through the simultaneous dissipation and storage of mechanical energy. The vibration damping medium 44 therefore acts as a strain-based damper and damps the vibrations of the blade 22 by removing energy from the vibrations due to its viscoelasticity.

Any suitable viscoelastic material may be used as the damping medium 44, such as an epoxy resin, polyurethane or other suitable polymer. The viscoelastic material has a glass transition temperature in the range of 50° C. to 60° C. This is advantageous because viscoelastic materials exhibit optimum vibration damping properties around their glass transition temperature and, as the blade 22 is likely to operate at a temperature of up to about 80° C., the viscoelastic material will be generally at a temperature close to its glass transition temperature.

During operation of the gas turbine engine 10, the cellular material 42 and the vibration damping medium 44 work together to stiffen the aerofoil 26 and damp the vibrations of the blade 22.

The use of a cellular material 42 is particularly advantageous since, in addition to providing the aerofoil with desirable stiffness properties, it enhances the vibration damping properties of the viscoelastic material by acting as a localised strain magnifier. In other words, as the aerofoil 26, and hence the cellular material 42, flexes during operation of the gas turbine engine 10, the large area of contact between the cellular material 42 and the viscoelastic material enables the energy of any vibrations to be readily transferred to the viscoelastic material so that the viscoelastic material can absorb the energy and thereby damp the vibrations. Metal foams are particularly suitable as they have good tensile strength and are very ductile due to their cellular structure, enabling energy to be readily transferred to the viscoelastic material.

In this regard, the stiffness of the cellular material 42 is key to the effective operation of the aerofoil 26. If the cellular material 42 is too stiff, it will not allow the aerofoil 26 to flex and will tend to transmit loads directly between the first and second walls 34, 36. As a result, the cellular material 42 will not transfer energy to the viscoelastic material to enable it to damp the vibrations. However, if the cellular material 42 is not sufficiently stiff, the stiffness properties of the aerofoil 26 will be inadequate to enable it to operate safely in the event of an impact.

The density of the metal foam may be greatest at the leading edge region of the aerofoil. The density of the metal foam may be greatest at the tip region of the aerofoil and least at the root region of the aerofoil. The first and second walls of the aerofoil are generally thicker towards the root region of the aerofoil and impact energies are lower in the root of the aerofoil. A lower density of metal foam in the root region would maximise strain in the vibration damping medium.

Generally the vibration damping medium is arranged throughout the cellular material, within the cells of the cellular material, in the cavity in the aerofoil e.g. in the cells of the open cell structure. The vibration damping medium reinforces the cellular material in the tip region of the aerofoil to resist impacts and provides vibration damping in the root region of the aerofoil.

However, it may be possible for parts of the cavity to not have vibration damping medium. Alternatively it may be advantageous to provide different types of vibration damping medium, e.g. having different stiffnesses, at different regions of the aerofoil e.g. different in the tip region and root region of the aerofoil. It may be advantageous to have lines of non-bonding between sections of the vibration damping medium in the towards the root region of the aerofoil that correspond to root break-up features. These lines of non-bonding may be provided by an air gap, non-setting silicone paste, mylar etc. For other types of aerofoil the distribution of the different types of vibration damping medium may be optimised for the particular application.

The aerofoil 26 according to the present invention may be fabricated using any suitable method. The following are examples of suitable methods which may be employed.

Method A

A cellular material 42 is initially formed with an aerofoil profile, and laid up in a die with the first and second walls 34, 36 surrounding the cellular material 42. The first and second walls 34, 36 are bonded together around their edges 40 to form an aerofoil 26 having a cavity 38 containing the cellular material 42.

The aerofoil 26 is then machined into the desired final aerofoil shape before the vibration damping medium 44 is introduced into the cavity 38 through a suitably positioned aperture in the aerofoil 26. The vibration damping medium 44 is finally cured.

Method B

A cellular material 42 is formed into the final desired aerofoil shape, and the first and second walls 34, 36 are formed to the same shape.

The formed cellular material 42 and the first and second walls 34, 36 are then laid up in a die, and the first and second walls 34, 36 are bonded together around their edges 40, for example by diffusion bonding, welding or brazing, to form an aerofoil 26 having a cavity 38 containing the cellular material 42. The cellular material 42 is simultaneously bonded to the inner surfaces 34a, 36a of the first and second walls 34, 36.

The vibration damping medium 44 is then introduced into the cavity 38 through a suitably positioned aperture in the aerofoil 26, before the vibration damping medium 44 is finally cured.

Method C

Method C is similar method to method B described above.

Method C differs only in that the step of forming the cellular material 42 into the desired aerofoil shape comprises initially forming the cellular material 42, and thereafter machining the cellular material 42 to form the final desired aerofoil shape before it is laid up in a die with the first and second walls 34, 36.

Method D

The first and second walls 34, 36, a powder material in the form of a metallic powder, and a foaming agent are laid up in a die. The first and second walls 34, 36 are joined around their edges 40, for example by diffusion bonding or laser welding, to form a cavity 38 containing the metallic powder and foaming agent.

The foaming agent is then activated to cause foaming of the metallic powder and, hence, the formation of a cellular material 42 in the form of a metal foam.

The vibration damping medium 44 is then introduced into the cavity 38 through a suitably positioned aperture in the aerofoil 26, before the vibration damping medium 44 is finally cured.

Method E

The first and second walls 34, 36 are diffusion bonded around their edges 40 and inflated to form an aerofoil 26 having a partial cavity 38. Superplastic forming may equally be employed.

A powder material, in the form of a metallic powder, and a foaming agent are introduced into the cavity 38, and the foaming agent is then activated to cause foaming of the metallic powder and, hence, the formation of a cellular material 42 in the form of a metal foam.

The aerofoil 26 may be formed into the final desired aerofoil shape either during, or after, the creation of the metal foam.

The vibration damping medium 44 is then introduced into the cavity 38 through a suitably positioned aperture in the aerofoil 26, before the vibration damping medium 44 is finally cured.

Method F

A cellular material 42 is initially formed with an aerofoil profile, and laid up in a die with the first and second walls 34, 36. A silk screen is located between the cellular material 42 and each of the first and second walls 34, 36.

The first and second walls 34, 36 are formed into the desired aerofoil shape by superplastic forming, the edges of the walls 34, 36 are then joined, for example by diffusion bonding or laser welding, to form an aerofoil 26 having a cavity 38 containing the cellular material 42. Bonding of the cellular material 42 to the first and second walls 34, 36 is prevented by the presence of the silk screens.

The silk screens are removed, and a structural adhesive is introduced into the cavity 38 and subsequently cured to bond the cellular material 42 to the inner surfaces 34a, 36a of the first and second walls 34, 36.

The vibration damping medium 44 is introduced into the cavity 38 through a suitably positioned aperture in the aerofoil 26, before the vibration damping medium 44 is finally cured.

Method G

Method G is similar to method F described above.

Method G differs in that the first and second walls 34, 36 and the cellular material 42 are formed into the desired final aerofoil shape before the walls 34, 36 are bonded around their edges 40 in the die.

Accordingly, the superplastic forming step of method F is omitted in method G.

Method H

Method H comprises initially forming an aerofoil 26 having a cavity 38 by superplastically forming the first and second walls 34, 36, and diffusion bonding or laser welding the edges 40 of the walls 34, 36.

A metallic material, such as titanium, in the form of a powder or hollow spheres, is introduced into the cavity along with a ceramic material, such as yttria, in the form of a powder.

The aerofoil 26 is heated under pressure to sinter the metallic powder material and bond it to the inner surfaces 34a, 36a of the first and second walls 34, 36. A suitable chemical is then introduced into the cavity 38 which chemically reacts with the ceramic powder material allowing it to be removed from the cavity 38. This results in the formation of a sintered metallic powder material having a cellular structure inside the cavity 38. The aerofoil 26 may also be heated to facilitate the chemical reaction.

The vibration damping medium 44 is then introduced into the cavity 38 through a suitably positioned aperture in the aerofoil 26, before the vibration damping medium 44 is finally cured.

There is thus provided an aerofoil 26 for a gas turbine engine 10 which has improved stiffness and vibration damping characteristics compared to existing aerofoils.

Although embodiments of the invention have been described in the preceding paragraphs with reference to various examples, it should be appreciated that various modifications to the examples given may be made without departing from the scope of the present invention, as claimed. For example, the aerofoil 26 may be of any suitable configuration. Any suitable viscoelastic material may be used as the vibration damping medium 44. The cellular structure of the cellular material 42 may be created using any suitable process.

Whilst endeavouring in the foregoing specification to draw attention to those features of the invention believed to be of particular importance, it should be understood that the Applicant claims protection in respect of any patentable feature or combination of features hereinbefore referred to and/or shown in the drawings, whether or not particular emphasis has been placed thereon.

We claim:

1. An aerofoil for a gas turbine engine, the aerofoil defining a cavity and comprising:
   a cellular material located in the cavity for stiffening the aerofoil, the cellular material comprising a plurality of open cells which form an open cell structure, wherein the cellular material is distributed throughout the cavity; and
   a vibration damping medium located in the cavity for damping the aerofoil, the vibration damping medium is dispensed throughout the cellular material in the cavity, wherein said vibration damping medium is arranged within said cells of said cellular material.

2. An aerofoil according to claim 1, wherein the cellular material is distributed generally uniformly throughout the cavity.

3. An aerofoil according to claim 1 wherein the aerofoil comprises an inner surface defining the cavity, and the cellular material is bonded to the inner surface.

4. An aerofoil according to claim 3, wherein the aerofoil comprises first and second opposed walls joined together around their respective edges to define the cavity therebetween, and the cellular material is bonded to the first and second walls.

5. An aerofoil according to claim 1, wherein the cellular material comprises a metal.

6. An aerofoil according to claim 1, wherein the cellular material comprises a metal foam.

7. An aerofoil according to claim 6, wherein a density of the metal foam is greatest at a leading edge region of the aerofoil.

8. An aerofoil according to claim 6, wherein a density of the metal foam is greatest at a tip region of the aerofoil.

9. An aerofoil according to claim 1, wherein the vibration damping medium is distributed generally uniformly throughout the cavity.

10. An aerofoil according to claim 1, wherein the vibration damping medium is dispersed generally uniformly throughout the cellular material.

11. An aerofoil according to claim 1, wherein the vibration damping medium comprises a viscoelastic material.

12. An aerofoil according to claim 11, wherein the viscoelastic material has a glass transition temperature in the range 20° C. to 100° C.

13. An aerofoil according to claim 12, wherein the viscoelastic material has a glass transition temperature in the range 50° C. to 60° C.

14. An aerofoil according to claim 1, wherein the aerofoil forms part of a blade of a gas turbine engine.

15. A gas turbine engine incorporating an aerofoil according to claim 1.

16. An aerofoil according to claim 1, wherein different types of vibration damping medium are provided at different regions of the aerofoil.

17. An aerofoil according to claim 16, wherein vibration damping medium in a tip region of the aerofoil has a different stiffness than the vibration damping medium in a root region of the aerofoil.

18. A method for fabricating an aerofoil for a gas turbine engine, the method comprising:
   forming an aerofoil having a cavity;
   providing a cellular material comprising a plurality of open cells which form an open cell structure inside the cavity, the cellular material being distributed throughout the cavity; and
   introducing a vibration damping medium into the cavity, the vibration damping medium being dispensed throughout the cellular material in the cavity, wherein said vibration damping medium is arranged within said cells of said cellular material.

19. A method according to claim 18, wherein the method comprises locating aerofoil walls around the cellular material and thereafter bonding the aerofoil walls together to define the cavity in which the provided cellular material is located.

20. A method according to claim 19, wherein the method comprises forming the cellular material with an aerofoil profile prior to locating the aerofoil walls around the provided cellular material.

21. A method according to claim 19, wherein the method comprises bonding the cellular material to the aerofoil walls prior to introducing the vibration damping medium into the cavity.

22. A method according to claim 19, wherein the method comprises bonding the cellular material to the aerofoil walls simultaneously with the step of bonding the aerofoil walls together.

23. A method according to claim 19, wherein the method comprises bonding the cellular material to the aerofoil walls after the step of bonding the aerofoil walls together.

24. A method according to claim 19, wherein the method comprises introducing an adhesive material into the cavity prior to introducing the vibration damping medium into the cavity, and curing the adhesive material to effect said bonding of the cellular material to the aerofoil walls.

25. A method according to claim 18, wherein the step of providing the cellular material inside the cavity comprises foaming a powder material inside the cavity to form a cellular structure.

26. A method according to claim 25, wherein the method comprises forming the aerofoil around the powder material to locate the powder material inside the cavity.

27. A method according to claim 25, wherein the method comprises introducing the powder material into the cavity after the step of forming the aerofoil.

28. A method according to claim 25, wherein the step of foaming the powder material comprises activating a foaming agent mixed with the powder material.

29. A method according to claim 18, wherein the step of providing the cellular material inside the cavity comprises providing first and second powder materials inside the cavity, sintering the first powder material, and thereafter removing the second powder material from the cavity so that the sintered first powder material defines a cellular structure inside the cavity.

30. A method according to claim 29, wherein the first powder material comprises a metal and the second powder material comprises a ceramic.

31. A method according to claim 29, wherein the step of removing the second powder material comprises introducing a chemical agent into the cavity and/or heating the aerofoil to melt the second powder material.

32. An aerofoil for a gas turbine engine, the aerofoil defining a cavity and comprising:
- a cellular material located in the cavity for stiffening the aerofoil, the cellular material being distributed throughout the cavity, the cellular material comprising metal foam in a form of a plurality of open cells which together form an open cell structure; and
- a vibration damping medium located in the cavity for damping the aerofoil, the vibration damping medium being dispersed throughout the cellular material in the cavity, wherein said vibration damping medium is arranged within said cells of said cellular material.

* * * * *